United States Patent
Forster

(10) Patent No.: US 11,630,979 B2
(45) Date of Patent: Apr. 18, 2023

(54) DUAL MODE EAS/RFID TAG BASED ON SELF TUNING RFID CHIP

(71) Applicant: Ian J. Forster, Chelmsford (GB)

(72) Inventor: Ian J. Forster, Chelmsford (GB)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 17/102,100

(22) Filed: Nov. 23, 2020

(65) Prior Publication Data

US 2021/0158123 A1    May 27, 2021

Related U.S. Application Data

(60) Provisional application No. 62/940,375, filed on Nov. 26, 2019.

(51) Int. Cl.
  *G06K 19/07*    (2006.01)
  *G08B 13/24*    (2006.01)

(52) U.S. Cl.
  CPC ..... *G06K 19/0726* (2013.01); *G08B 13/2417* (2013.01); *G08B 13/2431* (2013.01); *G08B 13/2448* (2013.01); *G08B 13/2468* (2013.01)

(58) Field of Classification Search
  CPC ........... G06K 19/0726; G06K 19/0724; G06K 7/10336; G08B 13/2448; H01Q 9/04; H01Q 7/005
  See application file for complete search history.

(56) References Cited

U.S. PATENT DOCUMENTS

| | | | |
|---|---|---|---|
| 7,132,946 B2 | 11/2006 | Waldner et al. | |
| 8,159,351 B2 | 4/2012 | Forster | |
| 8,174,388 B2 | 5/2012 | Lian et al. | |
| 9,047,524 B2 | 6/2015 | Ikemoto et al. | |
| 9,342,775 B2 | 5/2016 | Forster | |
| 2005/0237198 A1* | 10/2005 | Waldner ............. | G06K 19/0724 343/745 |
| 2008/0180248 A1* | 7/2008 | Lian ................... | G06K 7/10128 340/572.1 |
| 2009/0102663 A1* | 4/2009 | Hillegass ............. | H01Q 7/00 340/572.5 |
| 2010/0141452 A1* | 6/2010 | Lian ................... | G08B 13/2414 340/572.3 |
| 2010/0231362 A1* | 9/2010 | Smith ................. | G06K 19/0723 235/492 |
| 2014/0225793 A1* | 8/2014 | Ikemoto ............... | H01Q 5/10 235/492 |
| 2019/0097323 A1* | 3/2019 | Rokhsaz .............. | G01N 27/225 |

* cited by examiner

*Primary Examiner* — Mirza F Alam

(57) ABSTRACT

A self-tuning RFID device having an input capacitance that is adjustable in response to a detected signal. The self-tuning RFID device preferably comprises a variable capacitance RFID chip coupled to an inductor, and an input circuit driven by the detected signal from the variable capacitance RFID chip. A change in capacitance with the detected signal is delayed by a specific amount of time, thereby allowing the self-tuning RFID device to function as a dual mode EAS and RFID tag. The ESA functionality can be deactivated by a high field at or near its resonance frequency without disabling the RFID functionality. The effect of the high field may change the input capacitance permanently changing its resonance.

18 Claims, 9 Drawing Sheets

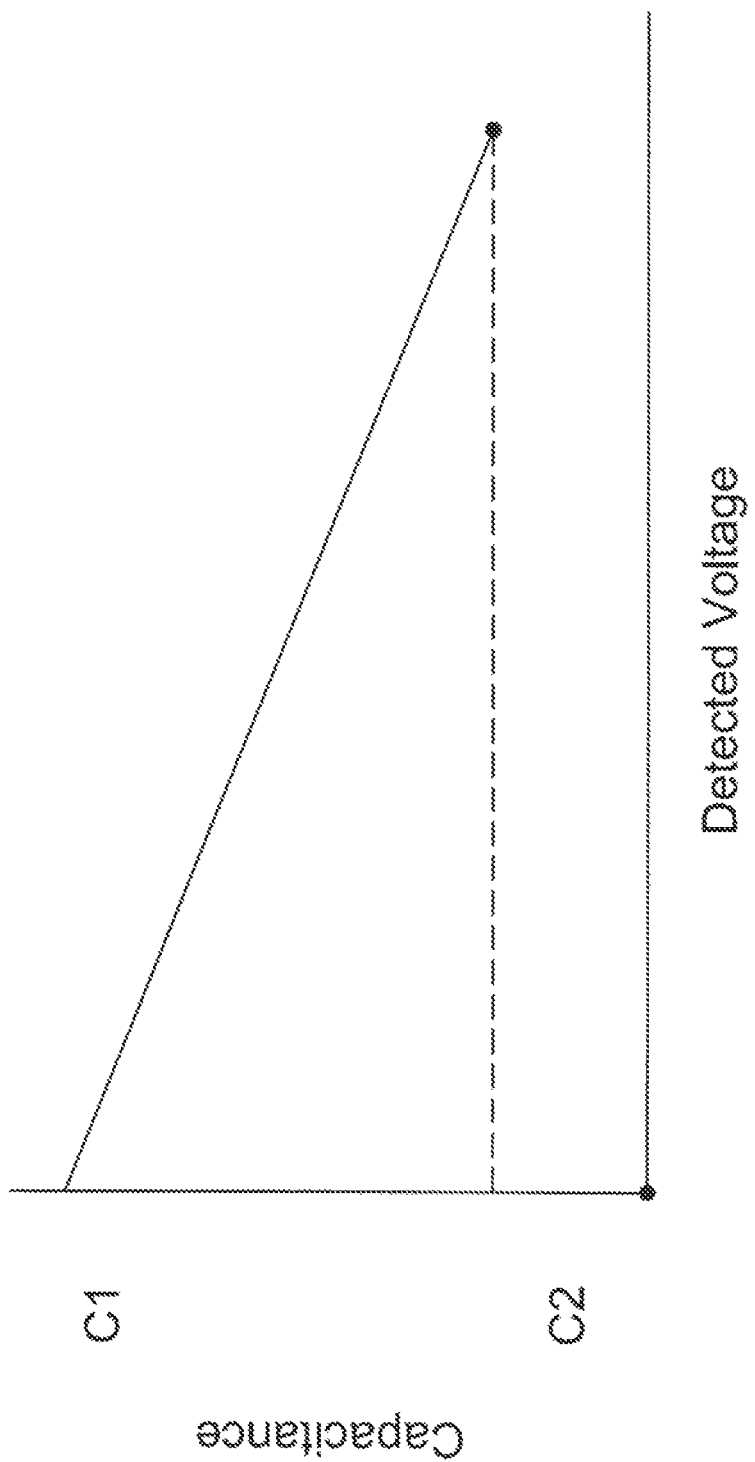

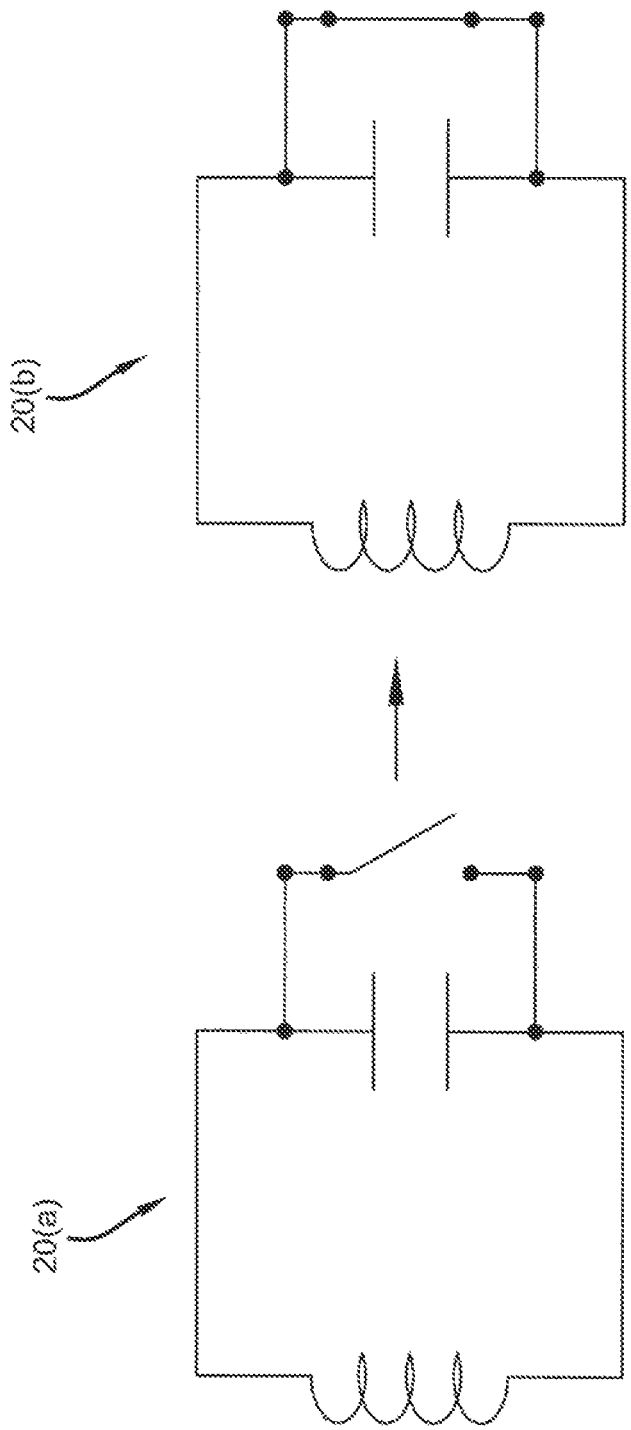

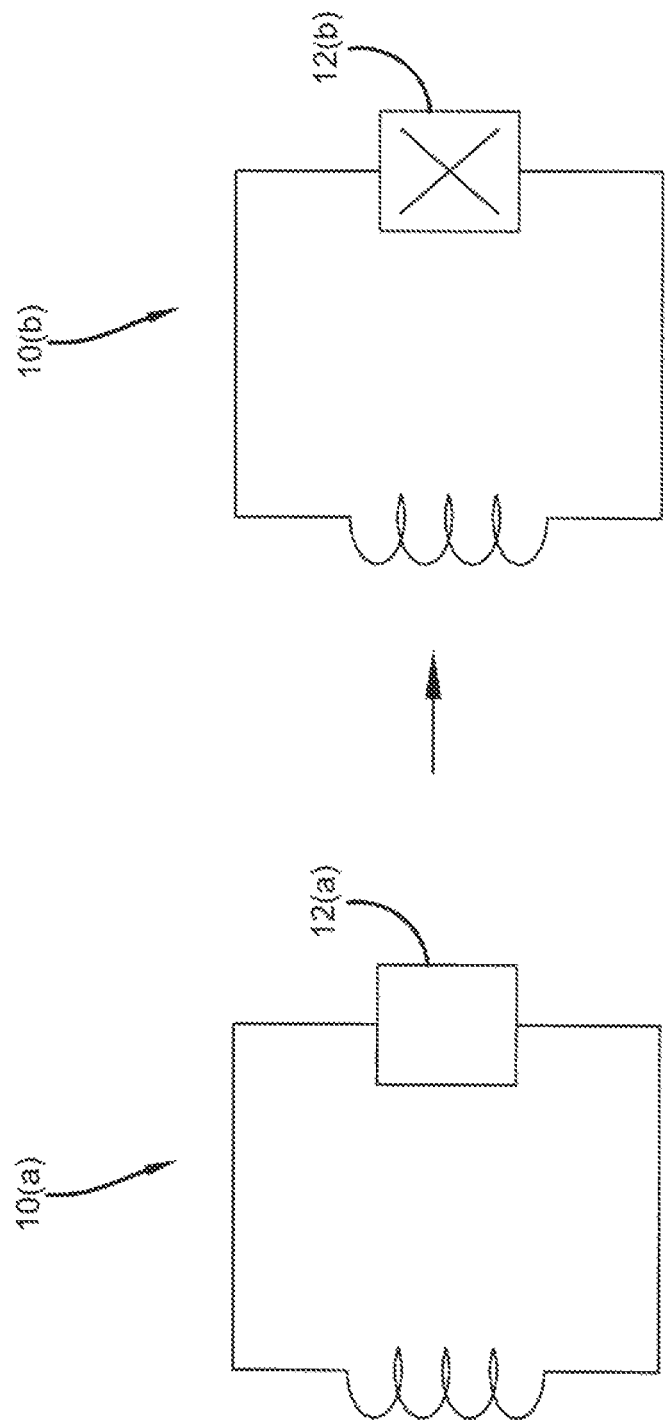

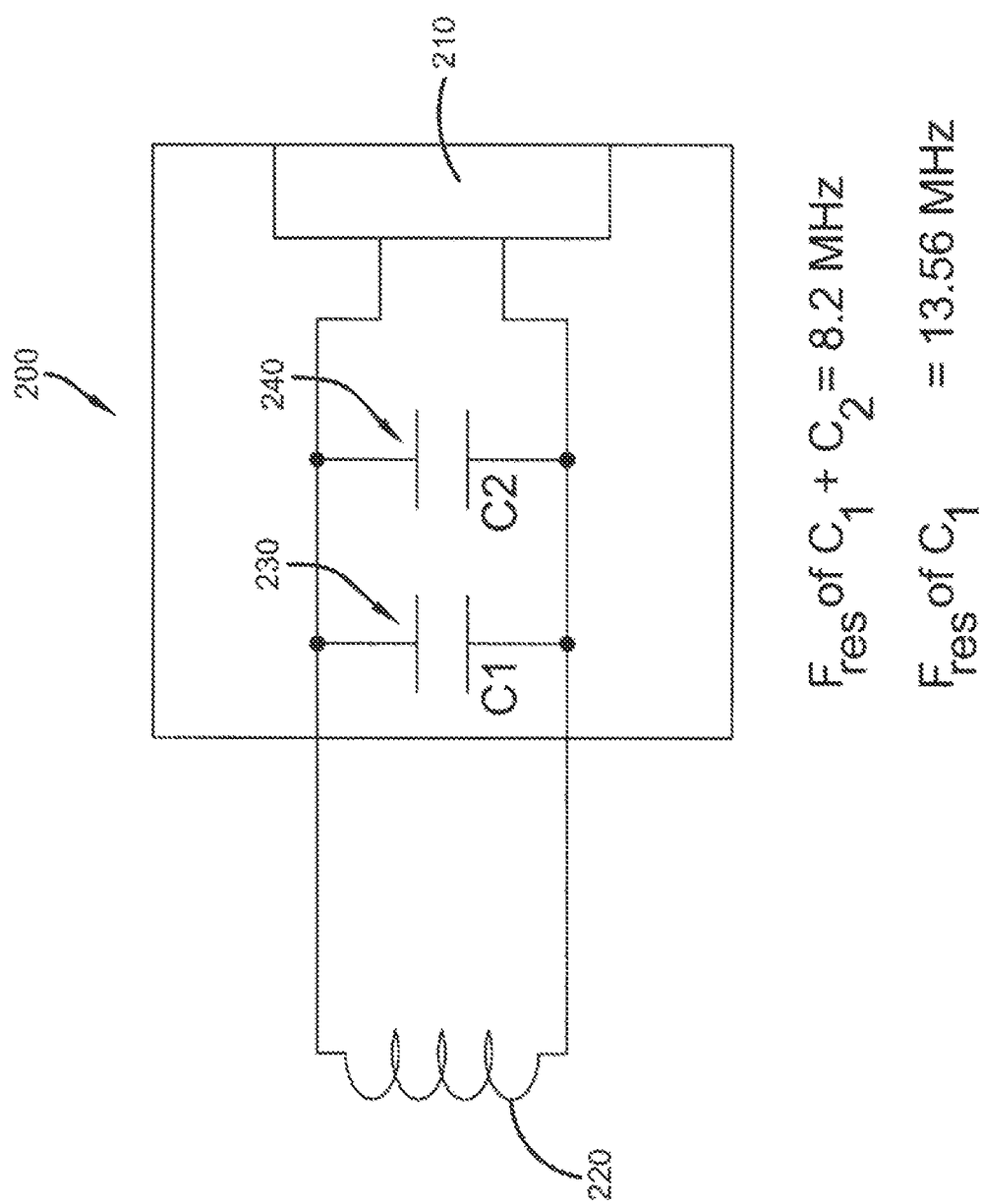

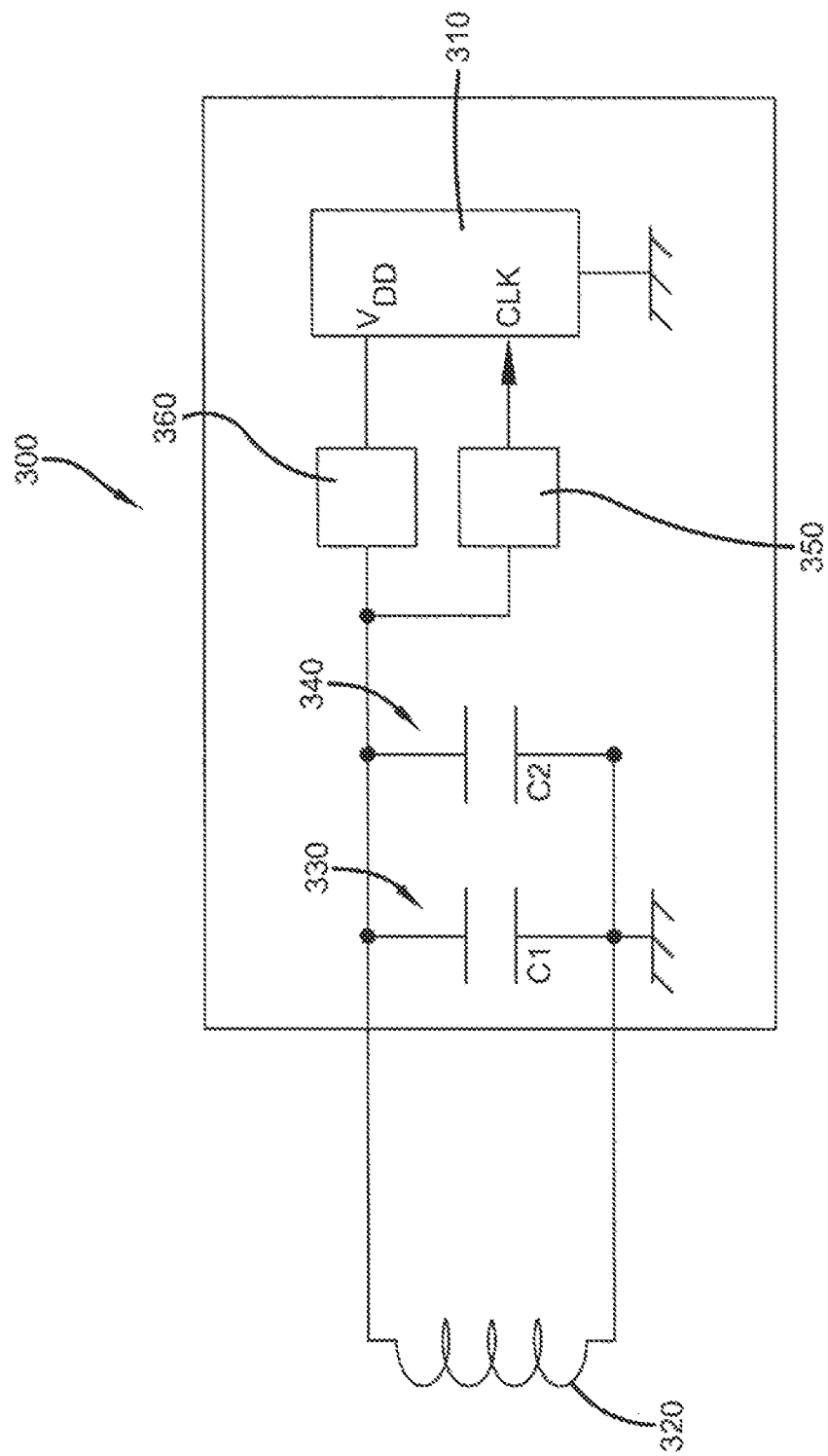

DUAL MODE EAS/RFID TAG BASED ON SELF TUNING RFID CHIP

CROSS-REFERENCE TO RELATED APPLICATION

The present application claims the benefit of U.S. Provisional Patent Application No. 62/940,375 filed Nov. 26, 2019, which is incorporated herein by reference in its entirety.

FIELD

The present invention relates generally to dual mode radio-frequency identification (RFID)/electronic article surveillance (EAS) tags, and their respective methods of manufacture and use. More specifically, the present invention relates to a modified RFID chip that can perform both RFID and EAS functions. The modified RFID chip is preferably formed as an alternative low-cost semiconductor structure, and has an input capacitance that is adjusted in response to the level of a detected signal.

BACKGROUND

"Automatic identification" is a broad phrase that applies to a host of technologies that are used to help machines identify objects, people, animals, etc. The phrase "automatic identification" is oftentimes used in conjunction with the phrase "automatic data capture", which can be generally described as the inputting or gathering of data without the use of key-punching, typing, or other type of manual data capture. Accordingly, individuals and businesses that wish to identify objects, people, animals, etc., and capture information about the same are able to use automatic identification and automatic data capture technologies to do so with minimal human labor and/or effort.

One type of automatic identification technology if RFID. Generally stated, RFID is the use of electromagnetic energy to stimulate a responsive device (known as an RFID "tag" or transponder) to identify itself and, in some cases, provide additional information and/or data stored in the tag. RFID tags and/or labels typically include a combination of antennas and analog and/or digital electronics, which may include, for example, a semiconductor device commonly referred to as the "chip", communications electronics, data memory, and control logic. Typical RFID tags have a microprocessor electrically connected to an antenna, and act as transponders, providing information stored in the chip memory in response to a radio frequency interrogation signal received from a reader, also referred to as an interrogator. The reader/interrogator, in turn, converts the radio waves from the RFID device into a form that can be utilized by a computer. In the case of passive RFID devices, the energy of the interrogation signal also provides the necessary energy to operate the RFID tag device.

RFID tags may be incorporated into or attached to any object or articles that a user wishes to later identify and/or track, such as products, equipment, individuals, vehicles, machinery, livestock, etc. In some cases, the RFID tag may be attached to the outside of the article with a clip, adhesive, tape, or other means and, in other cases, the RFID tag may be inserted within the article, such as being included in the packaging, or located within the container of the article or plurality of articles. RFID tags are manufactured with a unique identification number which is typically a simple serial number of a few bytes with a check digit attached. This identification number is typically incorporated into the RFID tag during its manufacture. The user cannot alter this serial/identification number, and manufacturers guarantee that each RFID tag serial number is used only once and is, therefore, unique. Such read-only RFID tags typically are permanently attached to an article to be identified and/or tracked and, once attached, the serial number of the tag is associated with its host article in a computer database. When used to track or manage inventory, the microprocessor stores unique identifying data associated with the inventory into the RFID tag, and an operator can use an external receiver/reader to retrieve the stored data and process or track the inventory.

As the name implies, electronic article surveillance (EAS) is related to the embedding or attaching of a disposable security tag or label to a retail item to deter shoplifting. Conventional EAS devices or tags comprise a resonator that, when activated, causes an alarm to sound when the EAS tag is brought within operative proximity of a detection apparatus, which is typically located at the exit of a store. However, if the EAS device is active, a similar signal will also be produced each time that a customer either properly removes purchased goods from the store, or enters another store with a similar detection apparatus. Generally, EAS tags are inexpensive and disposable items that are not removed from merchandise during checkout, which is generally true for RFID tags as well. For these reasons, a variety of different techniques have been developed to deactivate (or limit) EAS tags, typically by a clerk during checkout using deactivation apparatus that does not require physical contact with the tag.

Accordingly, RFID devices and EAS devices serve different purposes when it comes to retail items. As used in the present patent application, the terms "RFID device" and "EAS device" may refer to devices that are either embodied in separate tags, or to devices that are combined into the same tag. By and large, each of the systems utilizes different apparatus and methodology for activation and deactivation of the device. Therefore, retailers typically need to purchase and install separate systems for implementing and deactivating RFID and EAS functionality in their stores, which can be burdensome, space consuming and expensive.

Therefore, there exists in the art a long felt need for a dual mode EAS/RFID tag that can accomplish the functionality of a RFID tag, while also interacting with a standard EAS system to deter theft. There is also a long felt need in the art for a dual mode EAS/RFID tag that is adjustable in response to a detected signal.

The present invention discloses a redesigned and improved RFID chip that includes an alternative semiconductor structure, and that has an input capacitance that is adjustable in response to a detected signal level. More specifically, the self-tuning RFID chip is configured so that change in capacitance with detected signal is delayed by a specific amount of time. This avoids the need to power (or overpower) the device to "blow up" the capacitor and deactivate the one or more functionality of the chip, such as the EAS functionality.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Self-tuning RFID devices containing a variable capacitance RFID chip operatively coupled to an inductor are described herein. In some embodiments, the variable capacitance RFID chip is adjustable in response to a level of a detected voltage. This is referred to as "continuous variance" and is contrasted with "auto-tune" devices which optimize power delivery for a given frequency. Such "auto tune" devices require a switching step and do not allow for "continuous variance" as described herein.

In some embodiments, the self-tuning RFID device further contains an input circuit driven by the detected voltage from the variable capacitance RFID chip, and the detected voltage is capable of reducing the capacitance of the input circuit. In some embodiments, the self-tuning RFID device further contains a processing unit for adjusting the capacitance of the variable capacitance RFID chip. Consequently, the resulting self-tuning RFID device is a dual mode device having both an EAS functionality and a RFID functionality. As the detected voltage changes, the EAS functionality of the self-tuning RFID device may be disabled (or limited or reduced) while still preserving the RFID functionality. Such devices do not require overpowering the device in order to blow up the capacitor to deactivate the EAS functionality.

In some embodiments, the variable capacitance RFID chip is configured so that a delay is provided between the detected voltage and a voltage driving the input circuit. In some embodiments, the delay permits the variable capacitance RFID chip to deactivate the EAS functionality while preserving the RFID functionality during the delay, without having to apply high voltage to blow up the capacitor to deactivate the EAS functionality. In some embodiments, the self-tuning RFID device is operable in EAS functionality mode, a deactivated (or reduced activity) mode, and a RFID functionality mode. A detected voltage at a higher field in the RFID range causes a reduction in capacitance when the variable capacitance RFID chip is initially tuned at a lower field in the EAS range, thereby retuning the variable capacitance RFID chip to the higher field.

In some embodiments, a multi-frequency RFID device having an EAS functionality and a RFID functionality is provided. In some embodiments, the multi-frequency RFID device contains an RFID logic circuit and an inductor operatively coupled to the RFID logic circuit. In some embodiments, the multi-frequency RFID device further contains a first input capacitance and a second input capacitance, both of which are operatively coupled to the RFID logic circuit. At low field, the multi-frequency RFID device operates with the EAS functionality. At a higher field associated with the RFID functionality, the second input capacitance is disconnected, thereby disabling the EAS functionality and retuning the multi-frequency RFID device to maintain the RFID functionality. In some embodiments, the second input capacitance may be permanently disconnected with a delayed switching from the low field to the high field.

In some embodiments, a multi-frequency RFID device having an EAS functionality and a RFID functionality is provided. In some embodiments, the multi-frequency RFID device contains a RFID logic circuit and an inductor operatively coupled to the RFID logic circuit. In some embodiments, the multi-frequency RFID device further contains a first input capacitance and a second input capacitance, both of which are operatively coupled to the RFID logic circuit. In some embodiments, the multi-frequency RFID device further contains a timing circuit operatively coupled to the multi-frequency RFID device, and a power recovery detector also operatively coupled to the multi-frequency RFID device. In some embodiments, the multi-frequency RFID device is configured so that a parallel input resistance of the RFID logic circuit associated with a power drain dependent on frequency is alterable.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 3 illustrates a graph illustrating a detected voltage/capacitance relationship for the self-tuning RFID device of the present invention and in accordance with the disclosed architecture.

FIG. 4 illustrates a schematic diagram of a deactivation mechanism for the prior art resonant circuit in relation the EAS device in accordance with the disclosed architecture.

FIG. 5 illustrates a schematic diagram of a deactivation mechanism for the resonant circuit in relation to the RFID chip in in accordance with the disclosed architecture.

FIG. 8 illustrates a schematic diagram of one embodiment of a multi-frequency RFID device having both an EAS functionality and a RFID functionality in accordance with the disclosed architecture.

FIG. 9 illustrates a schematic diagram of an alternative embodiment of a multi-frequency RFID device having both an EAS functionality and a RFID functionality in accordance with the disclosed architecture.

DETAILED DESCRIPTION

Figure 1:
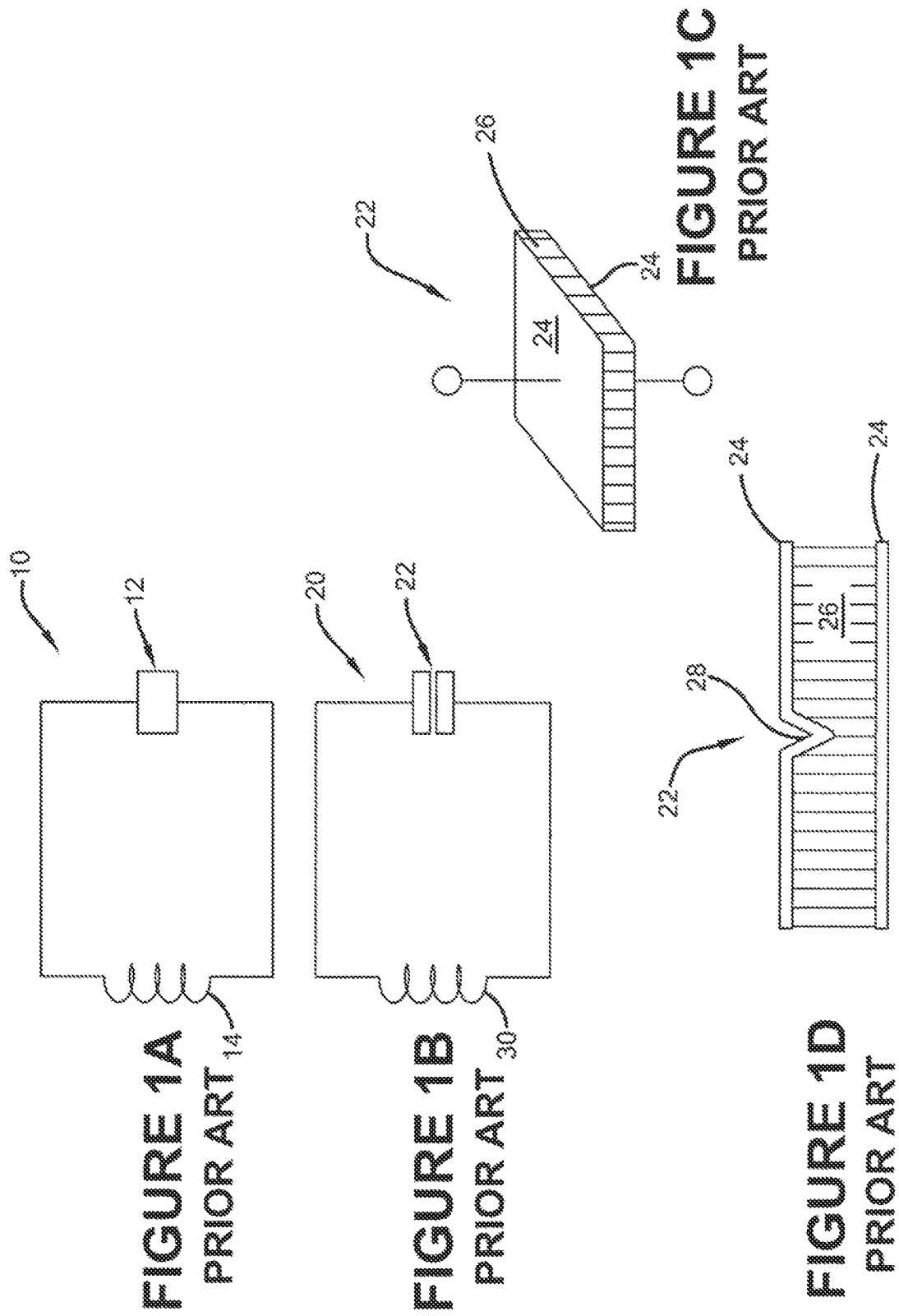
FIG. 1A illustrates a schematic diagram of a prior art resonant circuit in relation to a RFID chip in accordance with the disclosed architecture.
FIG. 1B illustrates a schematic diagram of a prior art resonant circuit in relation to an EAS device in accordance with the disclosed architecture.
FIG. 1C illustrates a perspective view of a capacitor of the prior art resonant circuit in relation to the EAS device in accordance with the disclosed architecture.
FIG. 1D illustrates a side view of the capacitor of the prior art resonant circuit in relation to the EAS device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Single, dual mode EAS/RFID tags that can accomplish the functionality of a RFID tag, while also interacting with a standard EAS system are described herein. In some embodiments, the RFID chip contains an alternative semiconductor structure of relatively low cost, and that has an input capacitance that is adjustable in response to the level of a detected signal. The dual mode EAS/RFID tag is configured so that a change in capacitance with the detected signal is delayed by a specific amount of time. The RFID tag is formed based on a RFID chip initially in the region of approximately 8.2 MHz, which is a frequency at which a resonator may interact with a standard EAS system. Continuous variance in combination with a delay in the chance in capacitance eliminates the needs to overpower the device in order to blow up the capacitor and deactivate (or limited or reduce the activity of) the EAS functionality.

In some embodiments, the initial EAS detected signal is below the operating frequency of the RFID device, and the effect of the initial EAS detected signal on input capacitance of the dual mode EAS/RFID tag is delayed for a specified period of time. After the delay, the voltage will cause the input capacitance to drop, thereby making the resonance frequency increase. However, this decreases the detected signal so that the circuit tends to lock onto the input frequency maintaining resonance and the highest probability of detection.

In some embodiments, the EAS device can be deactivated by a high field at or near its resonance frequency. However, if the capacitance is allowed to reduce with the input signal without a delay, this deactivation would not be possible as the EAS device would protect itself against excessive signal by tuning away from the resonance frequency. With the delay described herein, the dual mode EAS/RFID tag stays tuned to the original frequency for a period of time that is sufficient to allow the voltage/power from a high intensity field to disable the RFID device by permanently changing its input characteristics, such as capacitance, or providing a short circuit across the device's input terminals. Alternatively, the effect of the high field may be to change the input capacitance, so that the device permanently changes its resonance from 8.2 MHz (i.e., EAS functionality) to 13.56 MHz (i.e., RFID functionality).

In some embodiments, if the dual mode EAS/RFID tag is placed in the presence of a 13.56 MHz field, a signal will be detected that reduces the capacitance and tunes the dual mode EAS/RFID tag closer to 13.56 MHz. More specifically, a positive feedback process applies, so that as more field is detected, the capacitance reduces, which increases the detected signal. The positive feedback (i.e., intelligence) occurs until the dual mode EAS/RFID tag is optimally tuned at 13.56 MHz, and the tag can respond to a reader system with a data carrying signal. It will be appreciated that a device capable of efficiently acting as both a RFID device and a EAS device at relatively low cost would be beneficial, particularly to a retailer. Therefore, the dual mode EAS/RFID tag described herein is also compatible with existing EAS infrastructure, such as detectors placed at a point of sale.

FIG. 1A illustrates a prior art resonance device 10 containing a semiconductor component 12 and an inductor coil 14. The resonance device 10 is preferably operable at a frequency of 13.56 MHz, which is in the RFID operational range. Further, the semiconductor component 12 is preferably a silicon or metal oxide semiconductor device with a capacitance resonating with the inductor coil 14 at the desired frequency.

FIGS. 1B through 1D illustrate a prior art EAS device 20 containing a capacitor 22 and an inductor coil 30. The inductor coil 30 is preferably configured to resonate at 8.2 MHz, which is in the EAS operational range. As illustrated in FIG. 1C, the capacitor 22, formed as part of the structure of the EAS device 20, contains a pair of plates 24 that are separated by a dielectric layer 26. Additionally, as illustrated in FIG. 1D, the capacitor 22 is generally equipped with a dimple or depression 28 in at least one of plates 24 that extends into the dielectric layer 26, and that is arranged so that in a high field strength, a voltage is applied to the capacitor 22 such that there is a destructive breakdown of the capacitor 22.

Figure 2:
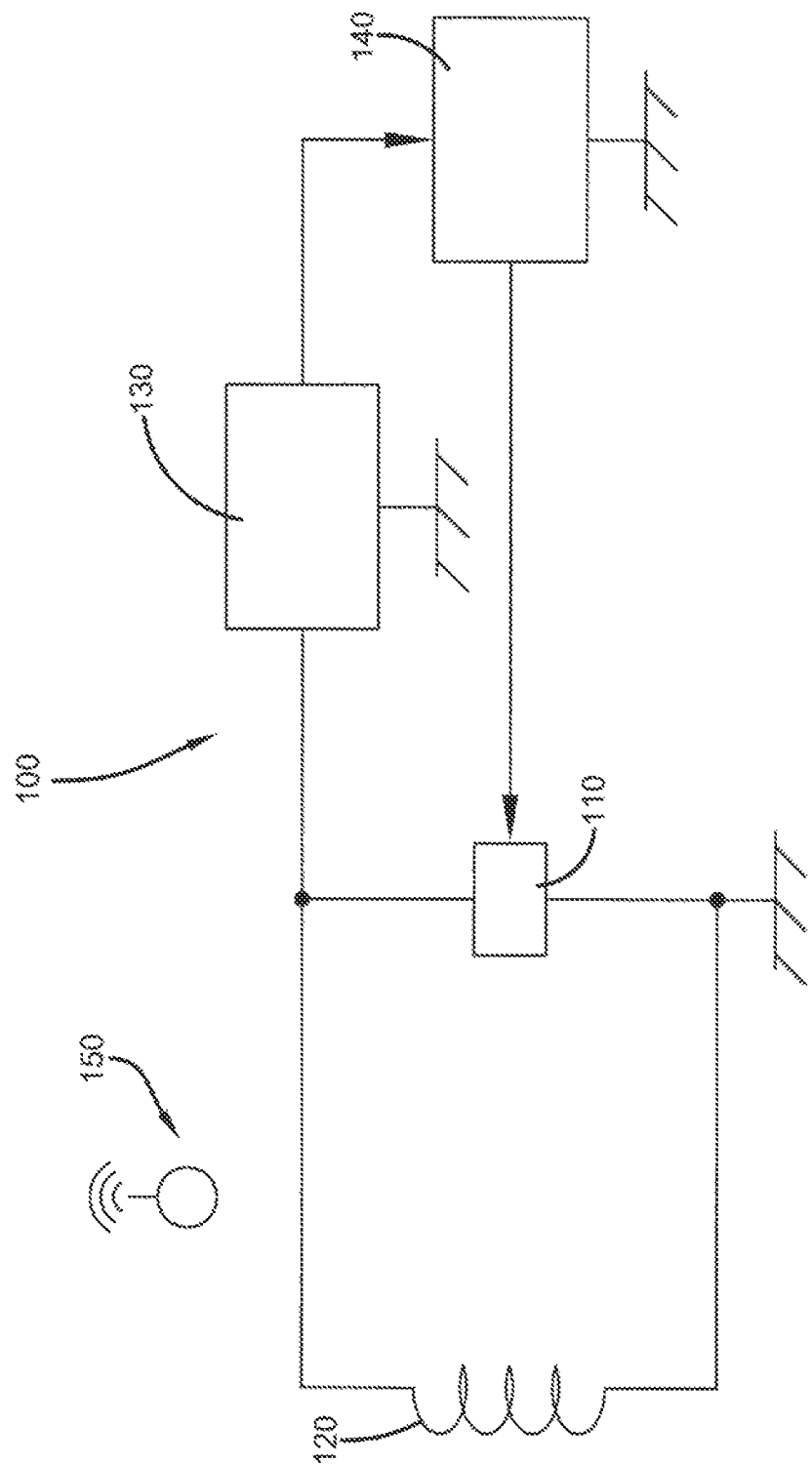
FIG. 2 illustrates a schematic diagram of one embodiment of a self-tuning RFID device with direction driven tuning in accordance with the disclosed architecture.

FIG. 2 illustrates a schematic diagram of one embodiment of a self-tuning RFID 100 as described herein in accordance with the disclosed architecture. More specifically, the self-tuning RFID device 100 is designed to work with both standard and existing EAS and RFID systems. As such, the self-tuning RFID device 100 has both an EAS functionality and a RFID functionality. In some embodiments, the self-tuning RFID device 100 contains a variable capacitance RFID chip 110 and an inductor 120 operatively connected to the variable capacitance RFID chip 110. The variable capacitance RFID chip 110 is configured to be adjustable in response to a level of a detected signal or voltage, such as a signal from an illuminating field 150. Further, the variable capacitance RFID chip 110 is connected across the inductor coil 120 with an initial capacitance.

In some embodiments, the self-tuning RFID device 100 further contains an input circuit 130, and a processing unit 140. The input circuit 130 is driven by the detected voltage from the variable capacitance RFID chip 110 such that the capacitance of the input circuit 130 is inversely proportional to the detected voltage, as illustrated in FIG. 3. The processing unit 140 adjusts the capacitance of the variable capacitance RFID chip 110. In some embodiments, the processing unit 140 is an analog processing unit. It will be appreciated by those of ordinary skill in the art that if the frequency illuminating the self-tuning RFID device 100 is above the resonant frequency, the reduction in capacitance with the detected voltage will cause a positive feedback effect where the self-tuning RFID device 100 locks on to the signal from the illuminating field 150. Therefore, the detected voltage will reduce the capacitance of the input circuit 130 from C1 to C2, as shown in FIG. 3. Additionally, the change in capacitance with the detected voltage is delayed for a period of time.

FIG. 4 illustrates a deactivation mechanism for the standard EAS tag 20. More specifically, when an EAS device is in an activated state 20(*a*) and placed in a high field, the voltage across the capacitor causes a destructive breakdown, as discussed above, thereby moving the EAS device from an activated state 20(a) to a deactivated state 20(b), as shown in FIG. 4. This may be accomplished using a simple pole switch or any other way commonly used in a circuit to bypass the capacitor as known in the art.

FIG. 5 illustrates a deactivation mechanism for the RFID resistance device 10, wherein the RFID chip or semiconductor component 12 acts as a fuse to deactivate the RFID resistance device 10. More specifically, if a RFID resistance device in an activated state 10(a) with an activated semiconductor component 12(a) is damaged in a way that alters the input capacitance so that the deactivated semiconductor component 12(b) no longer resonates at 8.2 MHz in a RFID device, the RFID resistance device will change to a deactivated state 10(b). The destructive mechanism may be in the form of a short circuit or open circuit.

In some embodiments, the capacitance of the self-tuning RFID device 100 may be permanently changed from a value resonating the inductor 120 at a frequency of 8.2 MHz to one resonating at a frequency of 13.56 MHz, thereby preserving the RFID functionality of device 100 while disabling its EAS functionality. In addition, the resistive load that the variable capacitance RFID chip 110 presents to the inductor coil 120 may change. For example, at a higher capacitance, as is associated with operation of the self-tuning RFID device 100 at a frequency of 8.2 MHz, the resistive part of the variable capacitance RFID chip 110 presented to the inductor 120 may be high. This may occur either using a series switch that disconnects the variable capacitance RFID chip 110 from the power detector, or as the resistive impedance of the chip is associated with power drain, by disconnecting the operational portion of the variable capacitance RFID chip 110 from the power detector. This creates a no load or very low load situation, therefore increasing the resistive component.

By changing the resistive component, the Q associated with longer range detection for the EAS function is increased at a frequency of 8.2 MHz, as compared to the Q when it is operating as an RFID chip at a frequency of 13.56 MHz. In this context, "Q" relates to the behavior of a resonant tuned circuit containing an inductance presented by the inductor coil, a capacitance presented by the chip, and a resistance presented by the chip and any other energy loss mechanisms in the structure, such as dielectric loss in materials. One definition of "Q" is the ratio of the total energy stored to the energy lost per cycle. More specifically, energy is stored in the inductor and capacitor (e.g., at zero voltage all the energy is in a magnetic field in the inductor, and at zero current the energy is stored in the capacitor as voltage) and the resistance dissipates energy. Q is calculated for a parallel model, the most appropriate for an RFID chip input, as the ratio of resistance to reactance.

Figure 6A:
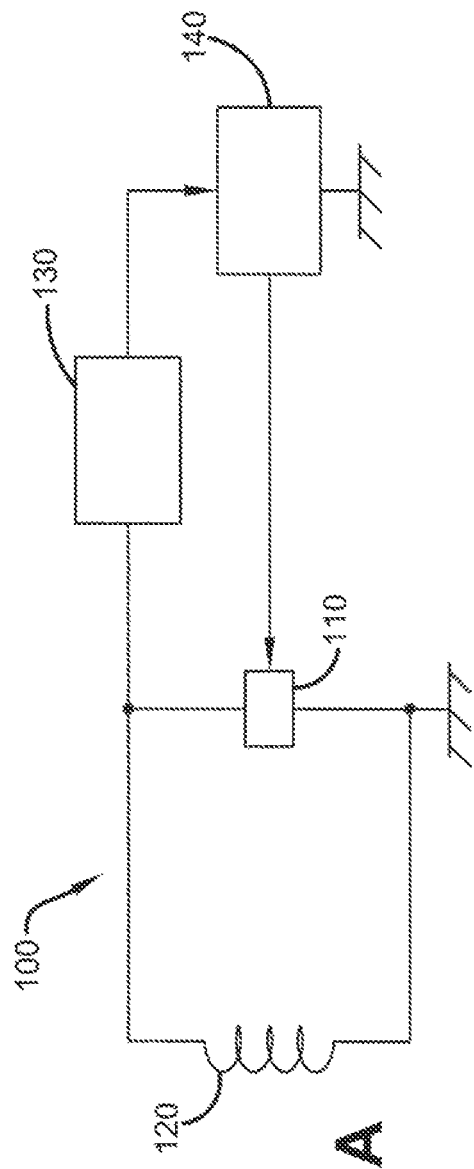
FIG. 6A illustrates a schematic diagram of one embodiment of a self-tuning RFID device in accordance with the disclosed architecture.
Figure 6B:
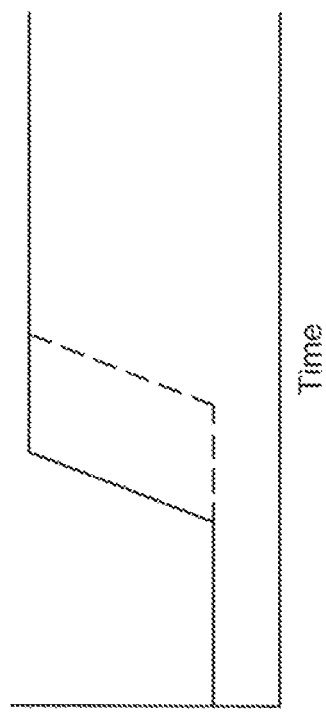
FIG. 6B illustrates a graph illustrating a detected voltage over time of the self-tuning RFID device of the present invention and in accordance with the disclosed architecture.
Figure 6C:
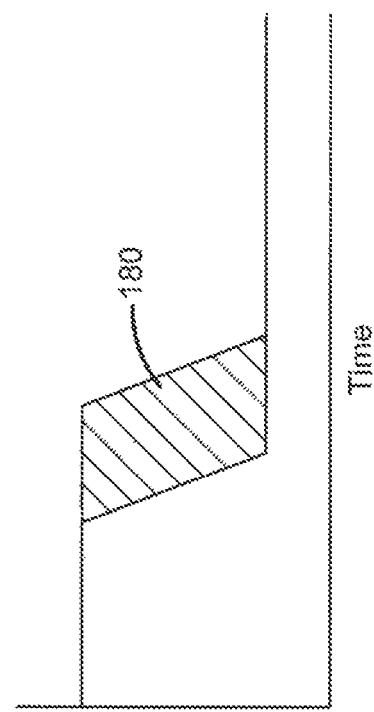
FIG. 6C illustrates a graph illustrating a period of delayed tuning of the self-tuning RFID device of the present invention and in accordance with the disclosed architecture.

As illustrated in FIGS. 6A through 6C, the self-tuning RFID device 100 is configured so that a delay is provided between the detected voltage and a voltage driving the input circuit 120. More specifically, using a high field strength deactivation signal on the self-tuning RFID device 100 will cause the resonance frequency of the self-tuning RFID device 100 to move away from the 8.2 MHz deactivation signal, thereby limiting power/voltage. By delaying the response with a period of delayed tuning 180 (as shown in FIG. 6C), the self-tuning RFID device 100 will dwell long enough at the 8.2 MHz frequency for deactivation of the self-tuning RFID device 100 to occur. This period of delayed tuning 180 allows the variable capacitance RFID chip 110 to deactivate its EAS functionality, while preserving its RFID functionality.

Figure 7A:
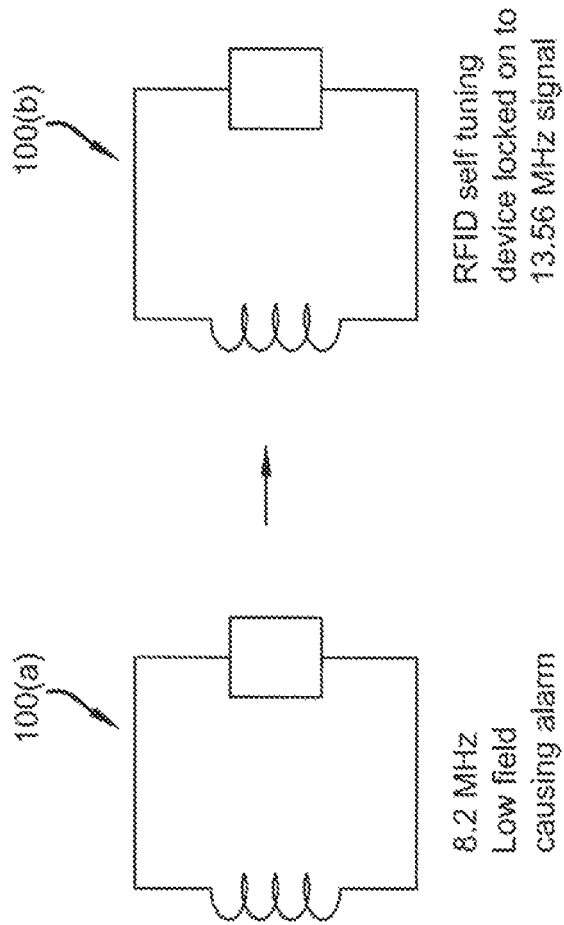
FIG. 7A illustrates a schematic diagram of one embodiment of the self-tuning RFID device of the present invention operating first with an EAS functionality, and then moving to a RFID functionality in accordance with the disclosed architecture.
Figure 7B:
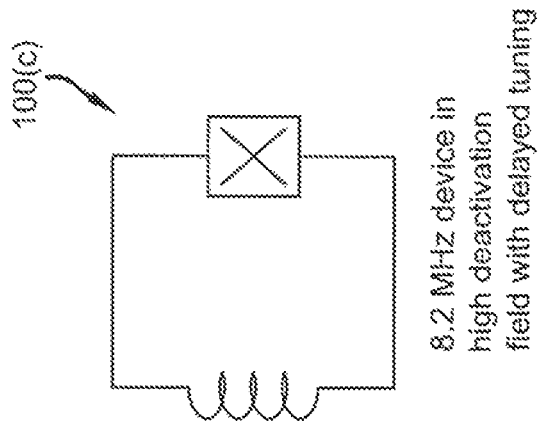
FIG. 7B illustrates a schematic diagram of one embodiment of the self-tuning RFID device of the present invention in a deactivated state in accordance with the disclosed architecture.

As best illustrated in FIGS. 7A and 7B, the self-tuning RFID device 100 is preferably operable in three modes, namely: (a) a self-tuning RFID device having an EAS functionality 100(a); (b) a self-tuning RFID device in a deactivated state 100(b); and (c) a self-tuning RFID device having a RFID functionality 100(c). The self-tuning RFID device having the EAS functionality 100(a) has a low field, high Q resonator tuned to 8.2 MHz working as an EAS device. The self-tuning RFID device in the deactivated state 100(b) is deactivated when, due to the delayed tuning caused by the detected signal, sufficient energy is coupled to the self-tuning RFID device 100 to disable it in any of the ways previously described. Further, the self-tuning RFID device having a RFID functionality 100(c) operates at 13.56 MHz with RFID functionality, whereas the detected 13.56 MHz signal when the self-tuning RFID device 100 is initially tuned to a frequency of 8.2 MHz causes a reduction in capacitance so that the self-tuning RFID device having a RFID functionality 100(c) is retuned toward the illuminating signal using a form of positive feedback.

In some embodiments, as illustrated in FIG. 8, a multi-frequency RFID device 200 has both an EAS functionality and a RFID functionality. More specifically, the multi-frequency RFID device 200 functions essentially as a two state self-tuning device, and contains a RFID logic circuit 210 and an inductor 220 operatively coupled to the RFID logic circuit 210. Additionally, the multi-frequency RFID device 200 further contains a first input capacitance (C1) 230 and a second input capacitance (C2) 240, both operatively coupled to the RFID logic circuit 210. The multi-frequency RFID device 200 preferably operates with the EAS functionality at low fields and with a resonance frequency of 8.2 MHz.

At higher fields, such as those associated with a reader (not shown) such as a mobile phone at 13.56 MHz, the second input capacitance (C2) 240 is disconnected, thereby bringing the tuning up to the optimum level for that particular reader. More specifically, the second input capacitance (C2) 240 is designed to break down at the higher field. When the multi-frequency RFID device 200 is exposed to a high field, with a delayed switching from C1+C2 to C1, the high field causes the second input capacitance (C2) 240 to be irreversibly disconnected, thereby disabling the EAS functionality of RFID device 200 while preserving its RFID functionality. For example, the second input capacitance (C2) 240 may be disconnected with a fuse in series with the multi-frequency RFID device 200, thereby bringing the resonance of the multi-frequency RFID device 200 up to 13.56 MHz so that the multi-frequency RFID device 200 will no longer trigger an EAS gate, but so that the multi-frequency RFID device 200 is still readable as a RFID tag.

In some embodiments, as illustrated in FIG. 9, a multi-frequency RFID device 300 has both an EAS functionality and a RFID functionality. More specifically, the multi-frequency RFID device 300 contains an RFID logic circuit 310 and an inductor 320 operatively coupled to the RFID logic circuit 310. Additionally, the multi-frequency RFID device 300 further contains a first input capacitance (C1) 330 and a second input capacitance (C2) 340, both operatively coupled to the RFID logic circuit 310. The multi-frequency RFID device 300 has the capability to alter a parallel input resistance of the RFID logic circuit 310 associated with power drain on frequency where a load presented to the inductor coil 320 is changed depending on the illumination frequency.

The multi-frequency RFID device 300 may further contain a timing circuit 350 that is operatively coupled to the RFID logic circuit 310. The timing circuit 350 is preferably a clock recovery and frequency detector. Various forms of a circuit only draw very low power when they are static, and not being clocked. However, various forms of a circuit do draw energy when being clocked, related to $½CV^2$, wherein C is the total capacitance of the RFID logic circuit 310 elements and V is the change in voltage.

The multi-frequency RFID device 300 may further contain a power recovery detector 360 that is operatively coupled to the RFID logic circuit 310. The multi-frequency RFID device 300 is designed to be clocked at the illumination frequency and to provide a synchronous response to a reader system (not shown). The timing circuit 350 or clock recovery system is designed not to clock at a frequency of 8.2 MHz by measuring a pulse length of an incoming clock signal, which keeps the RFID logic circuit 310 static and the input resistance high for EAS functionality. In comparison, the timing circuit 350 or clock recovery system is designed to clock at 13.56 MHz to allow the multi-frequency RFID device 300 to draw power and operate. It will be appreciated that the method of changing the resistance, and hence the resonant Q can also be used with the other examples of circuits, such as frequency dependent input capacitance.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A self-tuning RFID device comprising:
   a variable capacitance RFID chip that adjusts in response to a level of a detected voltage;
   an inductor operatively coupled to the variable capacitance RFID chip; and
   an input circuit powered by the detected voltage, wherein when the detected voltage from an illuminating field is above a resonance frequency, a reduction in capacitance of the variable capacitance RFID chip in response to the detected voltage locks the self-tuning RFID device on the illuminating field, and wherein the reduction in the capacitance with the detected voltage is delayed for a period of time.

2. The self-tuning RFID device of claim 1, wherein the capacitance of the input circuit is inversely proportional to the detected voltage.

3. The self-tuning RFID device of claim 1, wherein the detected voltage reduces the capacitance of the input circuit.

4. The self-tuning RFID device of claim 1, wherein the self-tuning RFID device has an EAS functionality and a RFID functionality.

5. The self-tuning RFID device of claim 4, wherein the RFID device functionality is preserved and the EAS functionality is disabled.

6. The self-tuning RFID device of claim 1, wherein a capacitance is permanently changed from a value resonating the inductor at 8.2 M HZ to a second value resonating the inductor at 13.56 M Hz.

7. The self-tuning RFID device of claim 1, wherein a resistive load that the variable capacitance RFID chip presents to the inductor is variable.

8. The self-tuning RFID device of claim 1, wherein a delay is provided between the detected voltage and a voltage driving the input circuit.

9. The self-tuning RFID device of claim 8, wherein the delay allows the variable capacitance RFID chip to deactivate an EAS functionality while preserving a RFID functionality.

10. The self-tuning RFID device of claim 1 further comprising a processing unit for adjusting a capacitance of the variable capacitance RFID chip.

11. The self-tuning RFID device of claim 1, wherein the self-tuning RFID device operates in at least one of: an EAS functionality mode; a deactivated state mode; and a RFID functionality mode.

12. The self-tuning RFID device of claim 1, wherein, when the self-tuning RFID device is initially tuned to a frequency of 8.2 MHz, the detected voltage causes a reduction in capacitance that retunes the self-tuning RFID device to a frequency of 13.56 MHz.

13. An RFID device having an EAS functionality and a RFID functionality comprising:
    a RFID logic circuit;
    an inductor operatively coupled to the RFID logic circuit;
    a first input capacitance operatively coupled to the RFID logic circuit; and
    a second input capacitance operatively coupled to the RFID logic circuit, wherein the RFID logic circuit is powered by a detected voltage, and wherein when the detected voltage from an illuminating field is above a resonance frequency it causes locking of the RFID device on the illuminating field, and wherein further the second input capacitance is disconnected, disabling the EAS functionality of the RFID logic circuit.

14. The RFID device of claim 13, wherein the RFID device operates with the EAS functionality at a resonance frequency of 8.2 MHz.

15. The RFID device of claim 13, wherein a resonance frequency of 13.56 MHz disables the EAS functionality while maintaining the RFID functionality.

16. An RFID device having an EAS functionality and a RFID functionality comprising:
    a RFID logic circuit;
    an inductor;
    a first input capacitance;
    a second input capacitance; and
    a timing circuit operatively coupled to the RFID logic circuit, wherein the RFID logic circuit is powered by a detected voltage, and wherein when the detected voltage from an illuminating field is above a resonance frequency it causes locking of the RFID device on the illuminating field, and wherein further the second input capacitance is disconnected, disabling the EAS functionality of the RFID logic circuit.

17. The RFID device of claim 16 further comprising a power recovery detector operatively coupled to the RFID logic circuit.

18. The RFID device of claim 16, wherein a parallel input resistance of the RFID logic circuit associated with a power drain dependent on a frequency is alterable.

* * * * *